United States Patent [19]

Patel et al.

[11] 4,327,410
[45] Apr. 27, 1982

[54] PROCESSOR AUTO-RECOVERY SYSTEM

[75] Inventors: Rameshchandra S. Patel, Kettering, Ohio; Mark R. Easley, Cupertino, Calif.

[73] Assignee: NCR Corporation, Dayton, Ohio

[21] Appl. No.: 134,246

[22] Filed: Mar. 26, 1980

[51] Int. Cl.³ .................. G06F 11/00; G06F 9/46; G06F 13/00
[52] U.S. Cl. .................. 364/200; 365/228
[58] Field of Search ... 364/200 MS File, 900 MS File; 371/10, 66; 365/226, 228, 229

[56] References Cited

U.S. PATENT DOCUMENTS

| | | | |
|---|---|---|---|
| 3,286,239 | 11/1966 | Thompson et al. | 364/200 |
| 3,321,747 | 5/1967 | Adamson | 364/200 |
| 3,801,963 | 4/1974 | Chen | 364/200 |
| 3,810,116 | 5/1974 | Prohofsky | 365/229 |
| 3,859,638 | 1/1975 | Hume, Jr. | 340/173 R |
| 3,916,390 | 10/1975 | Chang et al. | 340/173 R |
| 3,959,778 | 5/1976 | Brette | 364/200 |
| 3,980,935 | 9/1976 | Worst | 340/173 R |
| 4,075,693 | 2/1978 | Fox et al. | 364/200 |
| 4,096,560 | 6/1978 | Footh | 365/228 |
| 4,145,761 | 3/1979 | Gunter et al. | 365/227 |

OTHER PUBLICATIONS

Rayside et al., "A Minicomputer Power Fail Detection System", Chemical Instrumentation, vol. 7, No. 3, pp. 211–218, 1976.
Hicks et al., "Instruction Retry Mechanism For a Computer", IBM Tech. Discl. Bull., vol. 17, No. 8, Jan. 1975, pp. 2239–2242.

*Primary Examiner*—Gareth D. Shaw
*Assistant Examiner*—Eddie P. Chan
*Attorney, Agent, or Firm*—J. T. Cavender; Albert L. Sessler, Jr.; Elmer Wargo

[57] ABSTRACT

A system for preserving data associated with a memory unit having a volatile section and a non-volatile section. The system controls the transfer of data between the volatile and non-volatile sections of the memory unit and also handles successive impending power fail signals so as to preserve data such as transaction totals, for example, and also includes a control means to enable the system to return to a processing point at which the first of the impending power fail signals occurred, thereby avoiding reconstruction of an aborted transaction, for example.

3 Claims, 12 Drawing Figures

FIG. 10 SECTION 84A NORMAL SEQUENCE

FIG. 11

| TIME SECT. 84A SEQ. | Q9 | Q4 | Q3 E/S | Q1 | Q2 E/S | Q13 | Q12 | Q11 | Q10 DSB-TMR | Q6 | Q7 | Q8 WARM-30 | Q5 RESET-IN |
|---|---|---|---|---|---|---|---|---|---|---|---|---|---|
| Ⓐ | OFF | OFF | OFF | OFF | OFF | OFF | ON | OFF | ON | OFF | OFF | OFF | ON |
| Ⓑ | | | | | | | | | | | | | OFF |
| Ⓒ | | | | | | | | | | | | | |
| Ⓓ | | | | | | | | | | | | | |
| Ⓔ | ON | ON | ON | | | ON | | | | ON | ON | ON | |
| Ⓕ | OFF | OFF | OFF | ON | ON | | OFF | ON | OFF | | | | |
| Ⓖ | ON | | | OFF | OFF | OFF | | | | OFF | OFF | OFF | |
| Ⓗ | OFF | | | ON | ON | | | | | | | | |
| Ⓘ | | | | OFF | OFF | | ON | OFF | ON | | | | |
| Ⓙ | | | | | | | | | | | | | |
| Ⓚ | | | | | | | | | | | | | |
| Ⓛ | | | | | | | | | | | | | |
| Ⓜ | | | | | | | | | | | | | ON |

184 ← 118-A, 114-A, 98-A, 188-A

PROCESSOR AUTO-RECOVERY SYSTEM

BACKGROUND OF THE INVENTION

This invention relates to a system or means for handling the sequencing of data between the volatile and non-volatile portions of a memory unit during momentary power fluctuations including successive momentary power fluctuations so as to avoid the loss of transaction processing data such as totals and the like.

In certain financial terminals, for example, transaction processing (TP) data is developed for handling customers' accounts. This TP data is stored in memory units which are sometimes referred to as Non-Volatile Random Access Memory (NVRAMS). These NVRAMS contain a first section which acts as a normal RAM when the power thereto is on; however, these RAMS lose the data when the power thereto is turned off. These NVRAMS also contain a second section which comprises for example, Electrically Alterable Read Only Memory (EAROM) which section is non-volatile in that data (which is readily written into) is not lost therefrom when the power thereto is turned off. These NVRAMS are frequently used to store TP data such as teller totals, accumulators, transaction counters, supervisory codes, certain constants and terminal sign-in information, which TP data frequently has to be updated.

The financial terminal in which these NVRAMS are used generally has a power supply whose A.C. input is subjected to fluctuations in voltage, which fluctuations may be due to, for example, excessive demands on the associated A.C. source in the building in which the terminal is housed. The excessive demands (heavy loads) may be due to the operation of elevators, air conditioning units, and the like in the building, for example.

One of the problems with such terminals is that such a momentary fluctuation in the AC source is sensed by the terminal as an impending power failure causing the terminal to be placed in a complete "reset" in order to insure that only valid data will be retained in the memory unit. This resetting of the terminal could result in a considerable down time for the reconstruction of an aborted transaction via an audit trail, a restart of program loading operations and/or an establishment of disrupted communication lines.

SUMMARY OF THE INVENTION

In a preferred embodiment of this invention, the system comprises a memory unit having first and second sections for storing data, with the first section being volatile and the second section being non-volatile; means for processing data being operatively coupled to the memory unit for handling data; and means for controlling the transfer of data between the first and second sections, whereby the controlling means is adapted to transfer the data from the second section to the first section upon the occurrence of a first signal, to clear the data from the second section upon the occurrence of a second signal to provide a cleared second section, and also to transfer the data from the first section to the cleared second section upon the occurrence of a third signal which indicates at least an impending power failure to the memory unit; the controlling means also includes means for handling successive third signals so as to enable the system to preserve data which was stored in the first section and to enable the processing means to return to a point in processing data at which point the first one of the successive third signals occurred without losing any of the TP data referred to earlier herein.

BRIEF DESCRIPTION OF THE DRAWING

FIG. 11 is a chart showing the relationship of various transistors (with regard to being "on" or "off") included in different portions of the control logic and disable control circuit shown in FIG. 1B.

DETAILED DESCRIPTION OF THE INVENTION

Figure 1A:
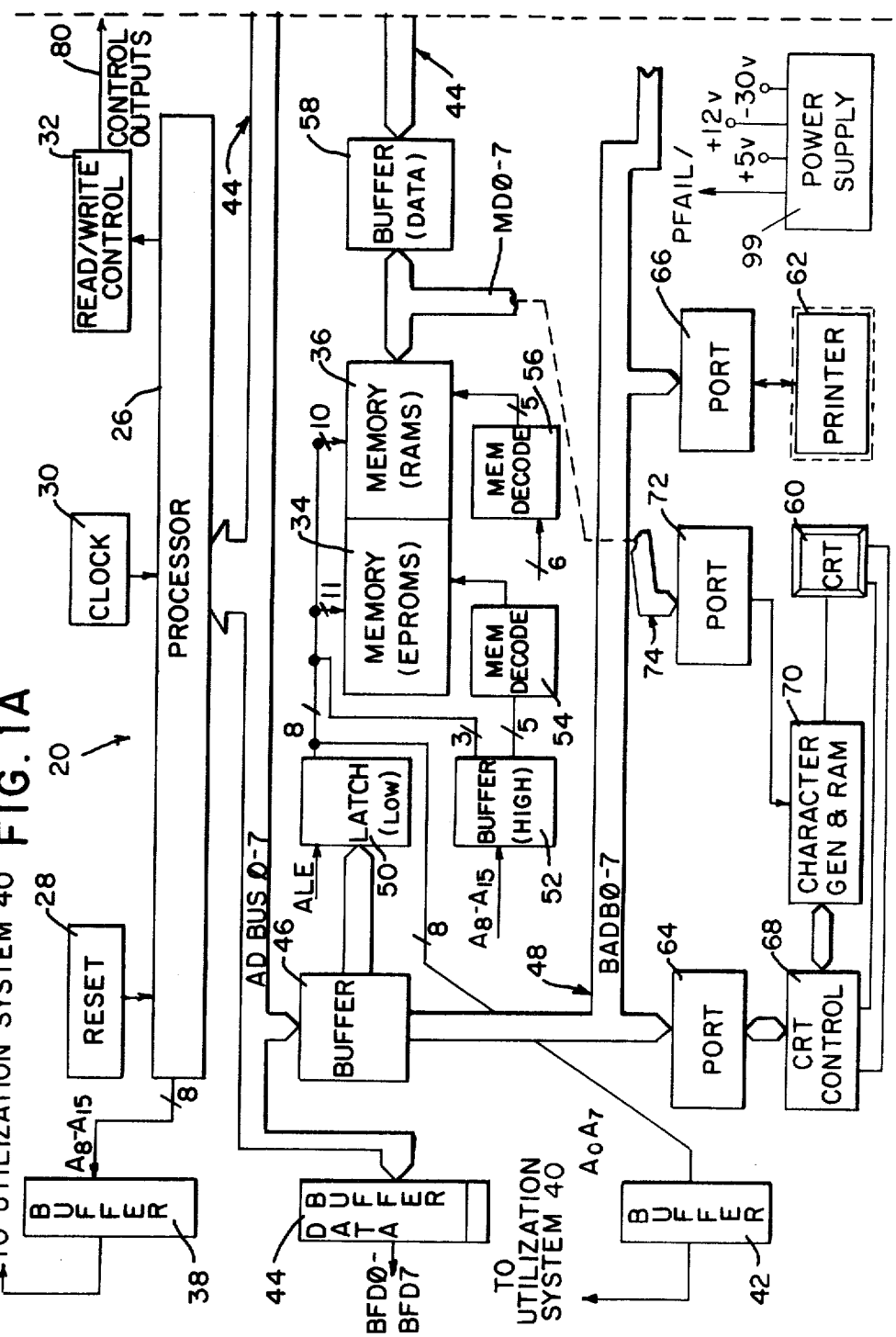
FIGS. 1A and 1B taken together show a terminal, such as a financial teller terminal in block form in which the automatic recovery system of this invention may be used.

As stated earlier herein, the data recovery system of this invention may be used, for example in a financial teller terminal. FIG. 1A shows a portion of a financial terminal 20 (hereinafter called terminal) in which the data recovery system 22 (FIG. 1B) of this invention may be used. The data recovery system 22 (hereinafter called system 22) is coupled to the terminal 20 via a conventional port 24. Because the terminal 20 may be conventional, it is described only generally herein.

The terminal 20 (FIG. 1A) includes a processor 26 having the usual reset 28, clock 30, and read/write control 32 circuit associated therewith. The terminal 20 also has a main memory 34 consisting of, for example, ultraviolet-light, erasable, Programmable Read Only Memories or EPROMS and also utilized Random Access Memories 36 (RAMS) as a scratch pad for the processor 26. The main memory 34 contains all the programs associated with data handling for the processor 26.

In the embodiment described, the processor 26 (FIG. 1A) is an eight bit processor such as an 8085 processor which is manufactured by Intel Corp. of California, although the principles of this invention may be extended to other processors.

The processor 24 (FIG. 1A) has 16 address lines associated therewith, with the most significant 8 bits ($A_8$–$A_{15}$) passing through a buffer 38 to a utilization system 40 and with the least significant 8 bits ($A_\phi$–$A_7$) passing through a buffer 42 to the utilization system 40.

The bus 44, which is an address and data bus is also marked AD Bus $\phi$-7, is used to transfer either 8 bits of data or the least significant 8 bits of the address between the processor 26 and the rest of the terminal 20. Eight bits of data leaving the terminal 20 pass through the data buffer 44, and the eight bits of data or the least significant 8 bits of an address pass through the buffer 46 to the buffered address or data lines BADB$\phi$–BADB7 which are also marked as 48. When an address is being supplied to the buffer 46, a control signal such as address latch enable (ALE), coming from the processor 26, will cause the address (the least significant 8 bits) to be latched into the latch 50. The remaining 8 bits or the most significant 8 bits ($A_8$–$A_{15}$) are supplied to a buffer 52.

In the embodiment described, 5 bits of the output of buffer 52 (FIG. 1A) are fed to a memory decode 54 which is used to select the appropriate section in memory 34 to be read, and similarly, the 6 most significant address bits are fed to a memory decode 56 which is used to select the appropriate section of the memory 36 for reading and writing operations. When data is to be read from memory, for example, the data therefrom passes through a buffer 58 prior to being placed on the bus 44. The buffers 38, 42, 46, 52, and 58 are conventional tri-state buffers which are used for effecting data transfer; three sequentially occurring time frames $T_1$, $T_2$, and $T_3$ (not shown) from the processor 26 are utilized to conventionally transfer data through these buffers in either direction.

The bus 48 (FIG. 1A) communicates with a plurality of input/output devices such as a display or a cathode ray tube (CRT) 60 and a printer 62 via conventional ports such as 64 and 66, respectively. The CRT 60 has the usual CRT control 68 and character generator and RAM 70 associated therewith as shown in FIG. 1A. Data from bus 44 or the RAM 36 is supplied to the character generator and RAM 70 via the port 72 and bus 74 which is also marked as MD$\phi$-7. The terminal 20 also has a keyboard 76 (FIG. 1B) for entering data thereon, and the keyboard 76 communicates with the bus 44 via a conventional port 78. The read/write control 32 (FIG. 1A) generates the usual control outputs 80, shown only generally, for conventionally controlling the flow of data in the terminal 20.

Earlier herein, it was stated that the terminal 20 (FIG. 1A) is coupled to the data recovery system 22 (FIG. 1B) via the port 24. In general terms, the system 22 includes a first memory unit 82 having some input/output functions associated therewith, a second memory unit 84, a processor 86, a control logic and disable control circuit 88 (hereinafter referred to as control circuit 88), and a bus 89 intercoupling the first and second memories (82 and 84) with the processor 86.

Figure 1B:
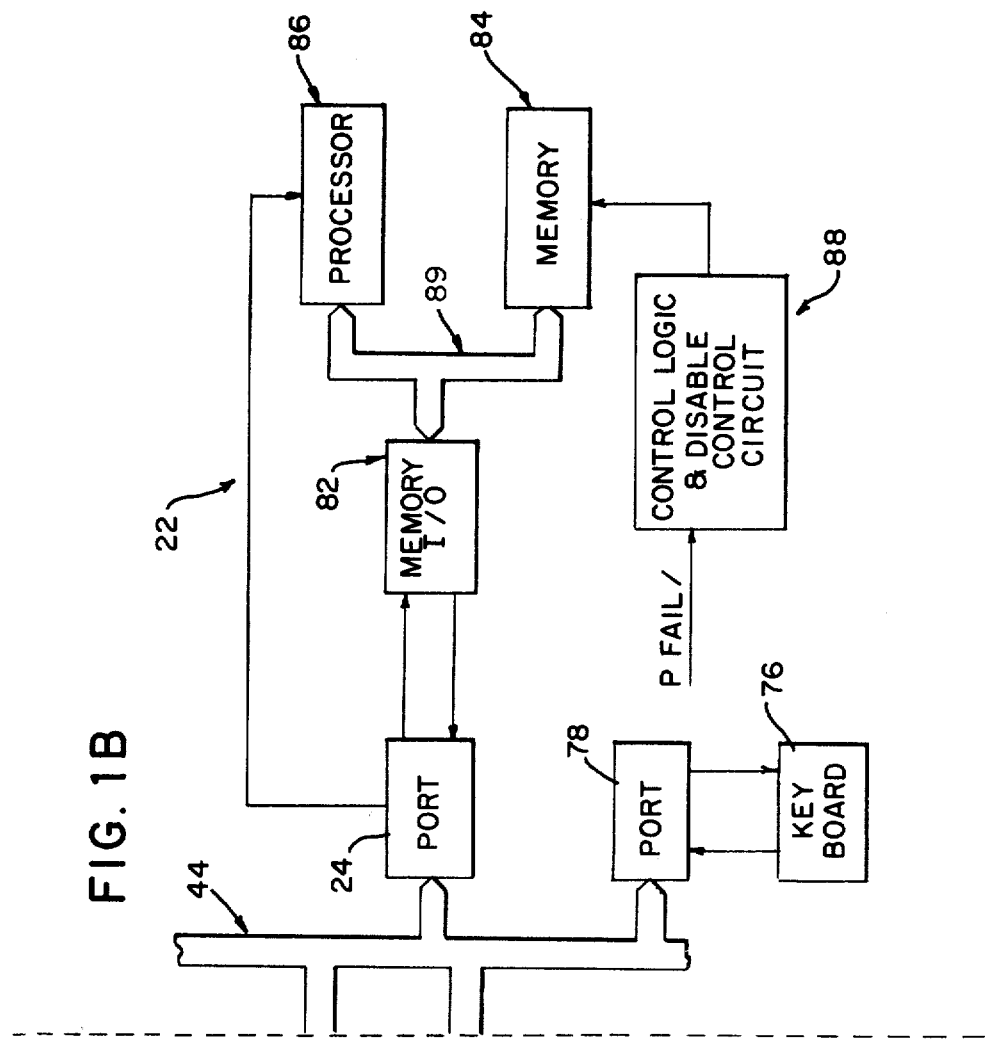
Figure 2:
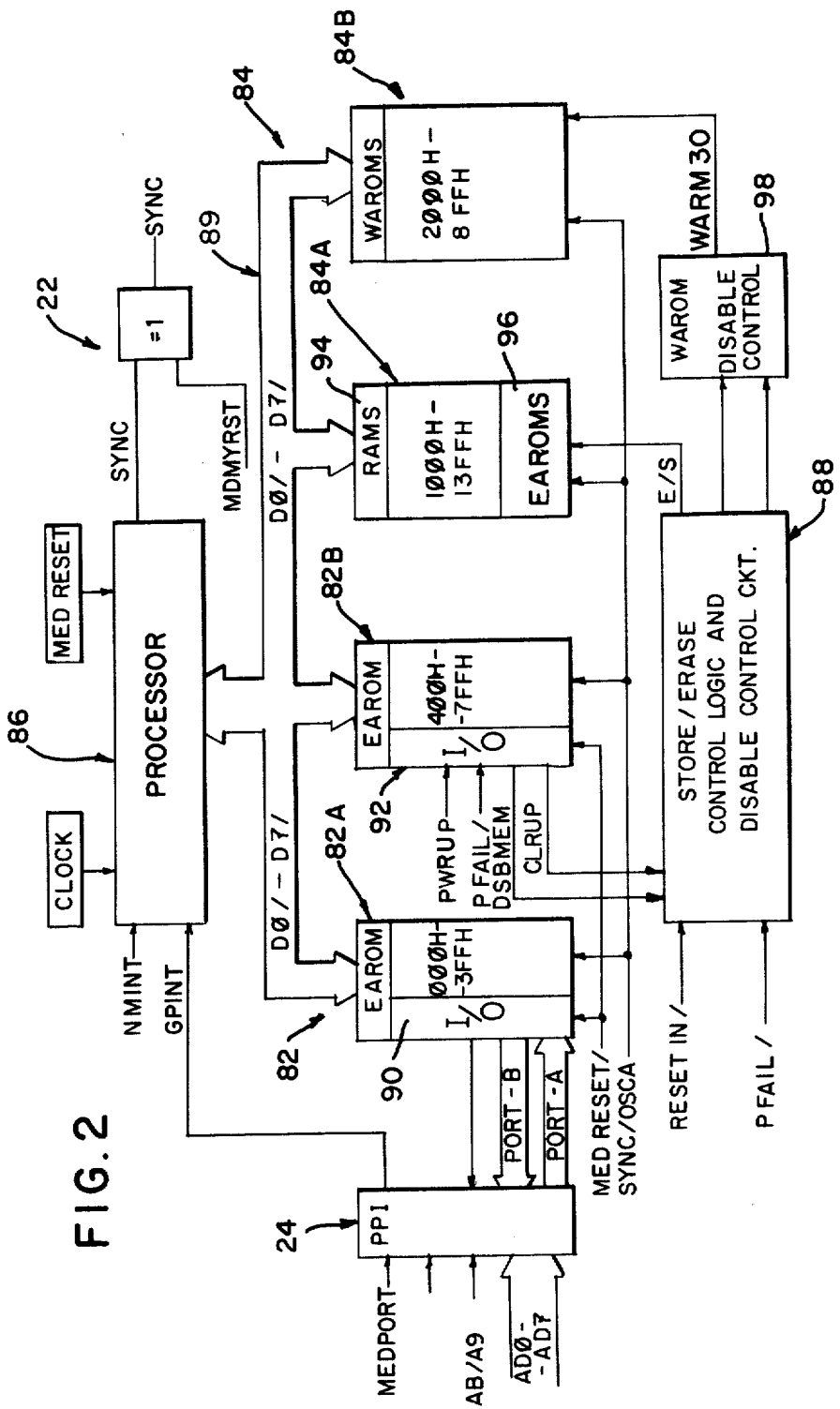
FIG. 2 is a block diagram showing more details of the automatic recovery system shown in FIG. 1.

The system 22 (FIG. 1B) is shown in more detail in FIG. 2. The port 24 essentially performs a handshaking function, and it can be programmed to effect the type of data exchange which is desired; one such programmed peripheral interface circuit which may be used for port 24 is the integrated circuit (IC) #8255 which is manufactured by Intel Corporation.

The memory unit 82 (FIG. 2) is comprised of the sections 82A and 82B, with section 82A having an input/output (I/O) port 90 associated therewith, and with section 82B having an I/O port 92 associated therewith. The sections 82A and 82B are comprised of Electrically Alterable Read Only Memories (EAROMs), with section 82A having the lower addresses and with section 82B having the higher addresses.

The memory unit 84 (FIG. 1B) is comprised of the sections 84A and 84B shown in FIG. 2. The section 84A contains Volatile Random Access Memory units and non-volatile EAROM's. The memory section 84B contains Word Alterable Read Only Memory units (WAROMs). In the embodiment described, one half of memory section 84A contains volatile RAMS 94 and the other half contains non-volatile EAROMS 96. Memory section 84A has the lower addresses and section 84B has the higher addresses. As an illustration, the range of addresses for each of the memory sections 82A, 82B, 84A, and 84B is shown in each of the sections in FIG. 2, with unit 82A having hex addresses of 000H to 3FFH and with unit 84B having hex addresses of 2000H to 8FFH. In one embodiment, the memory unit 84 consists of part #006-1022026 which is manufactured by NCR Corporation.

In general, the WAROMs of memory section 84B (FIG. 2) are used for storing user programs; these WAROMs can be altered under program control but are intended primarily for the long-term storage of data. The RAMs 94 of section 84A are used to store Terminal Processor (TP) data which is frequently updated, such data as teller totals, accumulators, transaction counters, supervisory codes, and terminal sign-in information. The RAMs 94 in section 84A have the advantage of acting as a normal RAM while the operating power from power supply 99 (FIG. 1A) is on, and when there is an impending power failure (indicated by a PFAIL/ signal from the power supply 99), the data which is in the volatile RAMs 94 is transferred to the non-volatile EAROMS 96. The non-volatile EAROMs 96 in section 84A are used for storing data from the RAMs 94 while the operating power is off. A series of operations (to be later described herein) allows the data to be block transferred from the RAMs 94 to the EAROMs 96 and vice versa as required.

The normal sequence of operations for transferring data between the RAMs 94 and the EAROMs 96 of memory section 84A (FIG. 2) will be discussed beginning with the operating power being off and with data being stored in the EAROMs 96. When operating power is turned on, a Restore operation is performed whereby data from the EAROMs 96 is transferred to the RAMs 94. After the data is so transferred, an Erase operation is performed on the EAROMs 96 so as to enable them to receive data from the RAMs 94 on the next power down. When a power fail signal (PFAIL/) is detected (indicating that valuable data in the RAMs 94 may be lost) a Store operation is performed whereby data from the RAMs 94 is transferred to the EAROMs 96. Some restrictions apply to the sequencing of the Restore, Erase, and Store operations. For example, neither the Restore nor the Store operations can be interrupted before being completed, otherwise invalid data could result; however, before a discussion of these restrictions, it appears appropriate to further discuss the elements included in the recovery system 22.

The control circuit 88 (FIG. 2) is used to control the sequencing of the transfer of data between the RAMs 94 and EAROMs 96 and also is used to prevent invalid situations from arising. A WAROM disable control circuit 98 coupled between the control circuit 88 and the WAROMs 84B is used to disable the WAROMs 84B. The following List #1 contains the various control signals used in the system 22 (FIG. 2) along with their definitions.

List #1

| Signal | Definition |
| --- | --- |
| RESETIN/ | This is a master system reset which is generated on "power up" or is generated manually. |
| PFAIL/ | This is an impending power fail detection signal generated by the associated power supply 99. |
| NMINT | This is a non-maskable interrupt request line which is triggered by the control circuit 88 when a PFAIL/ signal is detected; it initiates the Store routine sequence. |
| GPINT | This is a general purpose interrupt request line which is issued by the processor 26 through port 24 to alert the processor 86 that a command sequence is being initiated by the processor 26. |
| MEDRESET/ | This is a reset line to the processor 86 which reset line is under software control of the processor 26. |
| SYNC | This is a system bus timing synchronization pulse which is generated by the processor 86. |
| MDMYRST | This is a signal which is under control of software associated with the processor 26 and it allows a dummy SYNC pulse to be generated for internally resetting the memory sections 82A, 82B, 84A and 84B. |
| PWRUP | This is an input to the port 92 in system 22 from the terminal 20 which signal is set only on "power up"; this allows the firmware in system 22 to distinguish between a power up signal and a manual reset. |
| DSBNVRM | This is an output from the control circuit 88 which holds the memory section 84A in a disabled state during critical power up, power down and reset periods. |
| E/S | This is an ERASE/STORE/RESTORE signal from the control circuit 88 for controlling the Store, Restore, Erase, and Disable function of the memory section 84A. |
| WARM 30 | This is a disable line from the WAROM disable control circuit 98 to disable the memory section 84B during critical power up, power down, and reset periods. |

Figure 3:
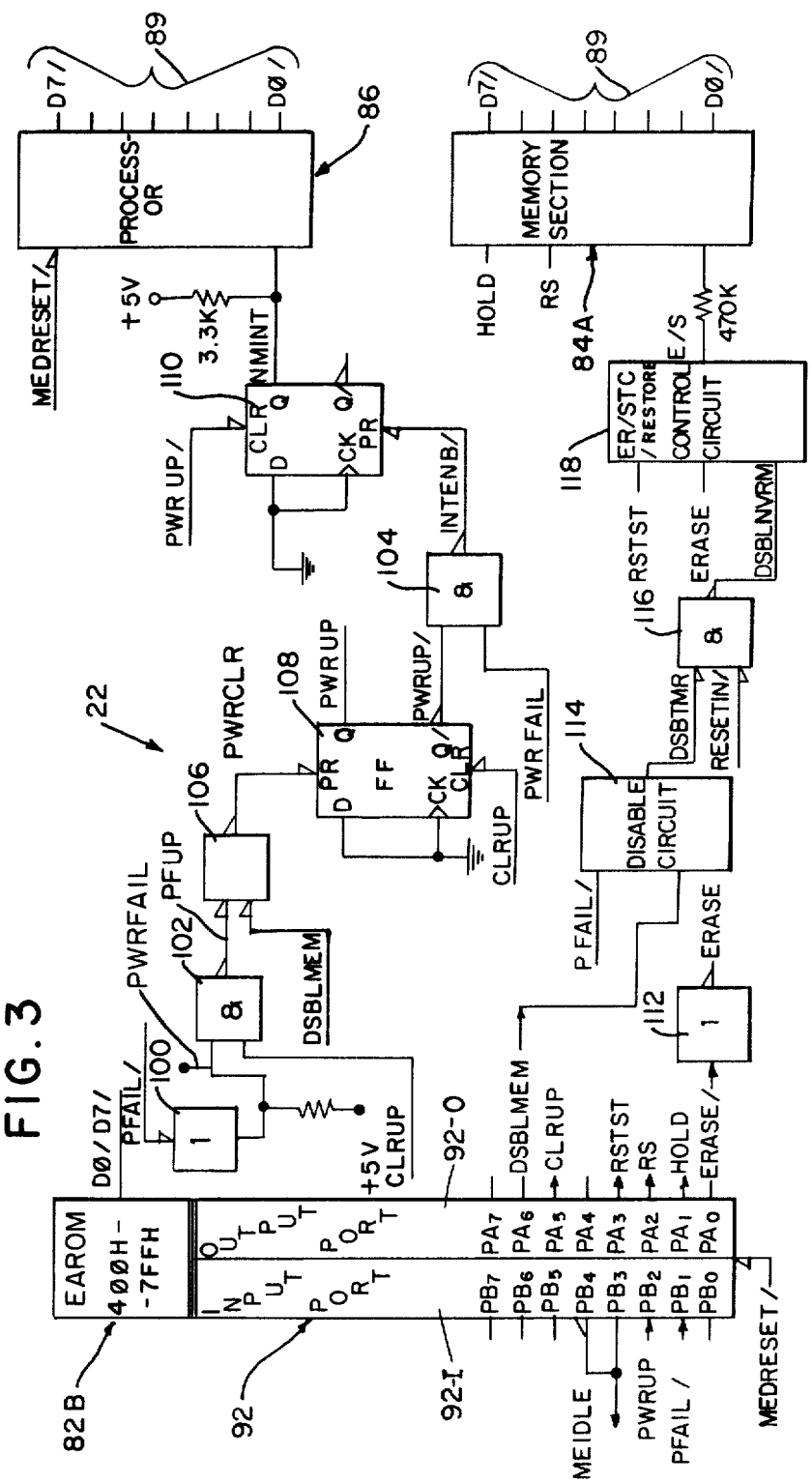
FIG. 3 is a block diagram showing additional details of the automatic recovery system shown in FIG. 2.
Figure 4:
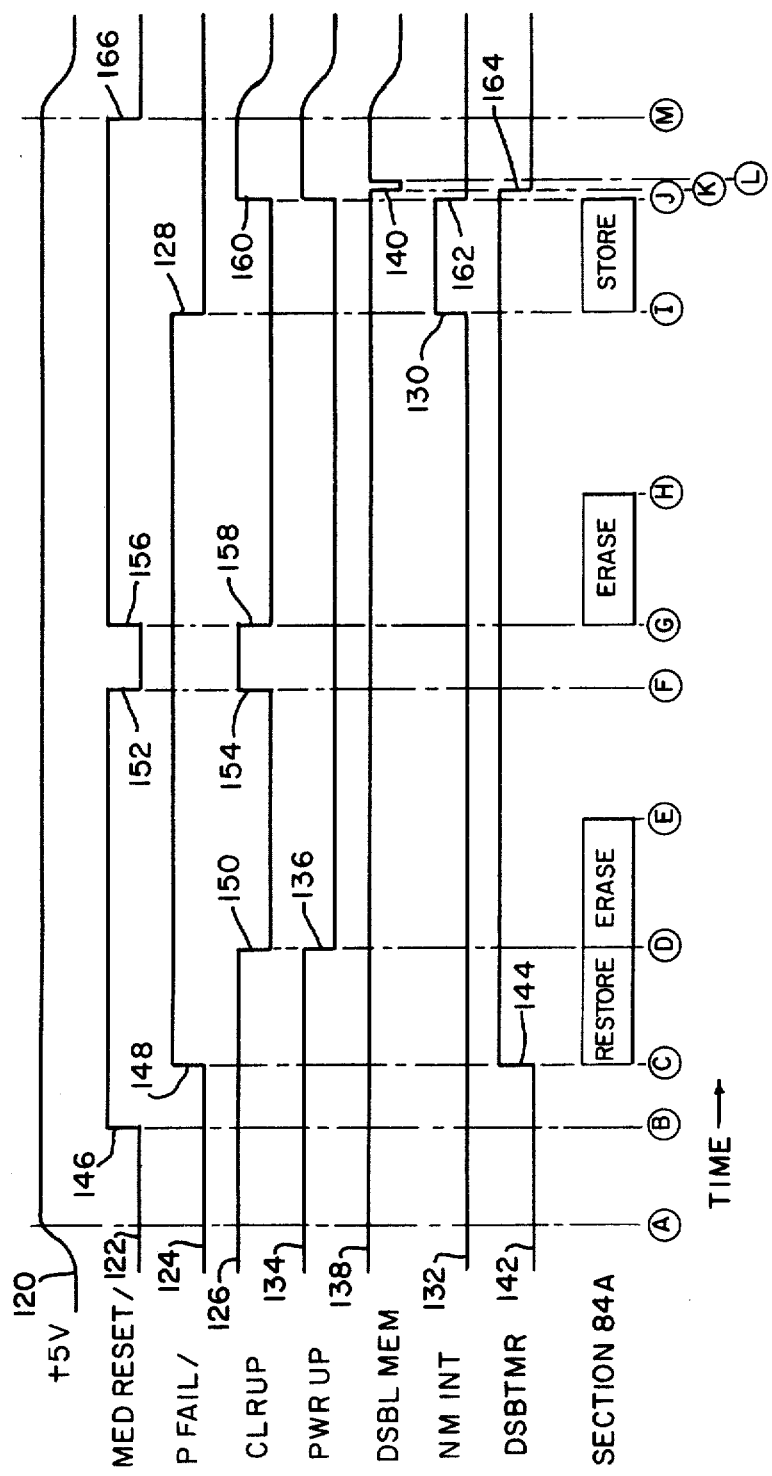
FIG. 4 is a timing diagram showing the relationship among various signals associated with a normal sequence.

The system 22 shown in FIG. 2 is shown in more detail in FIG. 3 and the associated timing diagrams for a normal operating sequence are shown in FIG. 4. The various letters A-M along the base of FIG. 4 represent various times in a typical step-by-step sequence.

A portion of the system 22 is shown in FIG. 3 and it includes the I/O port 92 which is part of the EAROM 82B. The system 22 also includes the inverter 100, NAND gates 102 and 104, AND gate 106, and "D"-type, flip-flops 108 and 110. Also includes in the circuit 22 are an inverter 112, a disable circuit 114, an AND gate 116, and a control circuit 118.

The I/O port 92 associated with the EAROM 82B (FIG. 3) is shown as having its input and output functions separated as input and output ports 92-I and 92-O, respectively. The normal operating sequence will be discussed with regard to FIGS. 3 and 4.

The line 120 (FIG. 4) represents the normal power-up for the system 22 whereby a +5 volt line is raised from zero volts to +5 volts at time A. The signals remaining in FIG. 4 will now be discussed as they relate to time A.

With regard to the signal MEDRESET/ shown on line 122 in FIG. 4, the main function of this signal is to reset the processor 86 (FIG. 2) and the ports 90 and 92 of the EAROMs 82A and 82B, respectively. At time A, the MEDRESET/ signal is at zero volts, and at power up, all eight lines ($PA_\phi$-$PA_7$) of port 92-O (FIG. 3) are initialized as an output port and all eight lines ($PB_\phi$-$PB_7$) of port 90-I are initialized as an input port. During and after removal of the MEDRESET/ signal from the EAROMs 82A and 82B, the output port 92-O is initialized at +5 volts in the embodiment described.

With regard to the signal PFAIL/ shown on line 124 in FIG. 4, a function of this signal is that it provides an impending power failure detection before the voltages from the power supply 99 for the systems 20 and 22 actually go out of tolerance or are at zero volts. In the embodiment described, the pre-power fail detection time, i.e., the time from the PFAIL/ signal switching from a high level to a low level to the voltages from the power supply 99 actually going out of tolerance is 20 milliseconds; this is referred to as a store time. In a normal operating mode, the line 124 is held at a low level from time A through time C for 35 milliseconds as a minimum after the power supplies have stabilized.

The clear up signal (CLRUP) is generated at terminal $PA_5$ of port 92-O (FIG. 3) of the EAROM 82B and is shown as being at a high level or +5 volts at time A on line 126 in FIG. 4. The CLRUP signal disables the flip-flop 110 (FIG. 3) as long as this signal is at a high level. When the CLRUP signal on line 126 changes to a low level, it causes the Q/ output of flip-flop 108 (FIG. 3) to rise to a high level and it enables the flip-flop 110. Only when the CLRUP signal to flip-flop 108 is at a low level and the PFAIL/ signal (line 124 in FIG. 4) to NAND gate 104 switches from a high level to a low level (as shown at point 128 on line 124) will the Q output of flip-flop 110 change to a high level (representing the NMINT signal) as shown at point 130 on line 132 of FIG. 4.

The power up signal (PWRUP) is generated at the Q output of flip-flop 108 (FIG. 3) and is shown as being at a high level at time A on line 134 of FIG. 4. When the PFAIL/ signal to inverter 100 (FIG. 3) is at a low level and the CLRUP signal to NAND gate 102 is at a high level, the flip flop 108 switches the PWRUP signal (at the Q output of flip-flop 108) to a high level. A low level for the CLRUP signal at the clear (CLR) input to flip-flop 108 resets it, causing the Q output thereof or the PWRUP output to fall to a low level, thereby indicating to the processor 86 (FIG. 2) via the terminal $PB_2$ of the input port 92 of the EAROM 82B that this was a true power-up or a manual reset. The PWRUP signal falling to a low level is shown at point 136 of line 134.

A disable memory signal (DSBLMEM) is generated at terminal $PA_6$ of the output port 92-O of the EAROM 82B as shown in FIG. 3, with the line 138 in FIG. 4 being used for this signal which is at a high level at time A during the normal power-up routine. The purpose of the DSBLMEM signal is to disable the circuit 114 (FIG. 3) so that the memory section 84A is not accidentally erased or written into with regard to the non-volatile portion (EAROM 96) of this section 84A.

A non-maskable interrupt signal (NMINT) is generated at the Q output of flip-flop 110 as shown in FIG. 3, with the line 132 (FIG. 4) being used for this signal which is initially at a low level at time A. When an impending power failure occurs, the signal PFAIL/ on line 124 in FIG. 4 falls from a high level to a low level at point 128, and this causes the Q output of flip-flop 110 to change from a low to a high as shown at point 130 on line 132. The Q output of flip-flop 110 (producing the NMINT signal) is connected to the highest-priority-interrupt input pin of the processor 86 which services the interrupt to cause the STORE operation to be performed. The STORE operation is shown occurring between times I and J in FIG. 4, and it should be recalled that the STORE operation transfers data from the volatile RAMS 94 to the non-volatile EAROMS 96 of section 84A.

The disable memory signal (DSBTMR), shown as line 142 in FIG. 4, follows the PFAIL/ signal and remains high from point 144 (after time C) until the disable memory (DSBLMEM) signal changes to a low level at point 140 and time K. The DSBLMEM signal comes from the terminal PA$_6$ of the output port 92-O of the section 82B (FIG. 3) and is fed into the circuit 114 (FIG. 3). The output of circuit 114 is the DSBTMR signal which is fed into the AND gate 116 whose output (the DSBLNVRM signal) is fed into the circuit 118 to disable this circuit 118 which in turn disables the ERASE/STORE (E/S) signals from the circuit 118 associated with the memory section 84A (FIG. 3), and the DSBNVRM signal is also fed into the WAROM disable control circuit 98 (FIG. 2) to disable the memory section 84B.

Having described what occurs at time A (FIG. 4) with regard to normal sequence timing in the system 22 (FIG. 2), the discussion will now proceed to an explanation of what occurs during the times B through M shown in FIG. 4.

At time B in FIG. 4, only the MEDRESET/ signal (coming from the system 20 in FIGS. 1A and 1B switches from a low signal to a high level as shown at point 146 on line 122 in FIG. 4. The MEDRESET /signal is fed into the ports 90 and 92 of the memory sections 82A and 82B (FIG. 2) and is also fed into the processor 86. In the embodiment described, the minimum time and the maximum time between the times A and B are 10 and 30 milliseconds, respectively. At time B, the processor 86 starts its program counter (not shown) as is conventionally done to start the operation of the system 22.

At time C in FIG. 4, the PFAIL/ and the DSBTMR signals are switched to a high level as shown at points 148 and 144, respectively, and the rest of the signals shown in FIG. 4 are unchanged. At time C, the memory section 84B (FIG. 2), consisting of the WAROMS, is enabled, and the firmware or transaction program associated with the processor 86 and located in the memory sections 82A and 82B has read the PFAIL/ signal switching from a low to a high level via terminal PB$_1$ of input port 92-I of memory section 82B (FIG. 3). Because the power up (PWRUP) signal to terminal PB$_2$ of the input port 92-I of memory section 82B is at a high level, the processor 86 starts the RESTORE operation at time C. During the RESTORE operation, the data which was stored in the non-volatile portion (EAROM 96) of memory section 84A is transferred to the volatile (RAM 94) portion of memory 84A. Any momentary power fluctuation in the PFAIL/ signal during a RESTORE operation will not set the NMINT flip-flop 110 (FIG. 3) because the NMINT signal is disabled by the flip-flop 108 (FIG. 3) due to the fact that the Q output of flip flop 108 is at a high level and the Q/ thereof is at a low level, indicating that the transaction program is in a RESTORE operation. The minimum time between time A and C in the embodiment described is 35 milliseconds.

At time D in FIG. 4, the RESTORE operation mentioned in the previous paragraph is completed and the firmware, hereinafter called the transaction program, associated with the processor 86 (FIG. 2) switches the clear up (CLRUP) signal from a high to a low level via terminal PA$_5$ of the output port 92-O of the memory section 82B (FIG. 3) as shown at point 150 in FIG. 4. The CLRUP signal, switching to a low (as at point 150 in FIG. 4) resets the flip-flop 108 in FIG. 3 which in turn allows the PWRFAIL signal (in the case of a momentary power failure) to pass through the gate 104, setting flip flop 110. The time required for the RESTORE operation to be completed is between 50 and 1000 microseconds (between times C and D). At the end of the RESTORE operation, the transaction program associated with the processor 86 (FIG. 2) enters the ERASE routine during which the non-volatile (EAROMs 96) portion of the memory section 84A is erased. The ERASE operation continues between times D and E of FIG. 4.

At time E, the ERASE operation shown in FIG. 4 is completed, and the transaction program associated with the processor 86 enters the normal mode of operation in which any of the usual transactions associated with the financial terminal 20 may be run. The duration of the ERASE operation between the times D and E in FIG. 4 is from 100 to 200 milliseconds.

The time between times F and G in FIG. 4 indicates that the processors 26 and 28 are in reset. When a manually-operated shunt 192 (FIG. 8) is placed in the operative position, the MEDRESET/ signal switches to a low level as shown at point 152 and the CLRUP signal switches to a high level as shown at point 154; this resets the processor 86 and causes the transaction program associated with the processor 86 to return to restart execution at address zero. Notice that the time between times F and G is located in the normal mode of operation.

At time G in FIG. 4, the shunt 192 mentioned in the previous paragraph is removed, causing the MEDRESET/ signal to return to a high level as at point 156. Also at time G, the processor 86, via its transaction program, starts at program count zero, and the processor 86 reads the PFAIL/ and the PWRUP signals (via input port 92-I in FIG. 3). Because the PFAIL/ signal is at a high level and the PWRUP signal is at a low level, it indicates that the reset is due to shunt 192 and there is no momentary power failure; accordingly, the transaction program associated with the processor 86 bypasses the RESTORE operation and switches the CLRUP signal (via output port 92-O) from a high to a low level as at point 158 in FIG. 4 to thereby initiate the ERASE operation beginning at time G in FIG. 4. The elapsed time for an ERASE operation between the times G and H is from 100 to 200 milliseconds. The transaction program associated with the processor 86 is now at the same position it was in after time E (FIG. 4) in that normal operations by the terminal 20 may be performed.

At time I in FIG. 4, the PFAIL/ signal switches from a high to a low level as shown at point 128. The PFAIL/ signal (entering via the port 92-I in FIG. 3)

also causes the Q output of flip-flop 110 (FIG. 3) to change from a low to a high level as shown at point 130 in the NMINT signal (FIG. 4) as previously explained. A high level in the NMINT signal causes the processor 86 (FIG. 2) and its associated transaction program to enter the highest priority interrupt service routine as previously explained. At time I in FIG. 4, the data which is stored in the RAM 94 of the memory section 84A is in the process of being transferred into the non-volatile EAROMs 96 of memory section 84A in the STORE operation shown in FIG. 4. The time required to complete the STORE operation ending at time J in FIG. 4 is between one and twenty milliseconds in the embodiment described. The data transferred to or stored in the EAROMs 96 can be retained from 3 to 30 days without keeping power supplied to the terminal 20 in the embodiment described; however, the periods for storing will depend upon the particular memory units used for section 84A.

At time J in FIG. 4, the data which was in the RAMs 94 has been transferred or stored in the EAROMs 96 of section 84A. The transaction program associated with the processor 86 then switches the CLRUP signal from a low to a high level as shown at point 160 in FIG. 4. The high level of the CLRUP signal sets the flip-flop 108, causing the Q output thereof to switch from a low to a high level, producing a low level at the Q/ output (PWRUP/) of flip-flop 108 which PWRUP/ signal is also fed into the CLR input of flip-flop 110 which in turn causes the Q output thereof, the NMINT signal, to switch to a low level as shown at point 162 in FIG. 4. When the NMINT signal is disabled or at a low level by the CLRUP signal being at a high level, it indicates that the STORE operation (ending at time J in FIG. 4) has been completed, and that the terminal 20 is ready for either a power off condition or for the PFAIL/ signal to switch to a high level.

At time K in FIG. 4, the transaction program associated with the processor 86 causes the DSBLMEM signal (at output port 92-O in FIG. 3) to momentarily switch to a low level as shown at point 140 (FIG. 4), and this low level is fed into the circuit 114 (FIG. 3) which disables it and causes the DSBTMR signal to change from a high to a low level as shown at point 164 in FIG. 4.

From times L to M in FIG. 4, the transaction program associated with the processor 86 waits for the PFAIL/ signal to change from a low to a high level which would indicate that the terminal 20 is to begin normal operations.

At time M in FIG. 4, the MEDRESET/ signal switches from a high to a low level at point 166, indicating that the terminal 20 is losing power.

Figure 5:
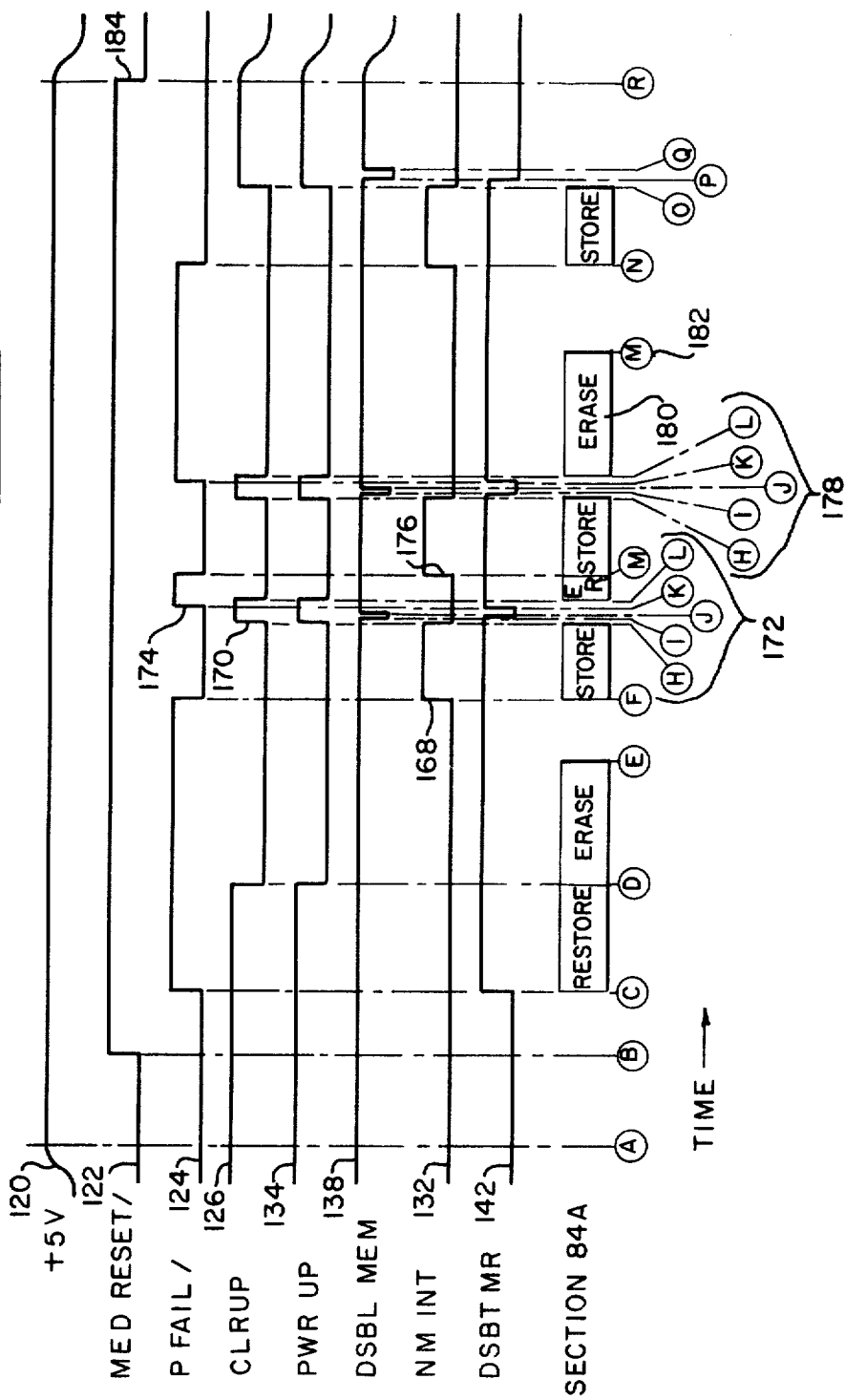
FIG. 5 is a timing diagram showing the relationship among various signals associated with a momentary power failure mode of operation.

FIG. 5 is a timing diagram showing the relationship among the various signals shown in FIG. 4 during a momentary power failure. The various signals shown in FIG. 4 are identified by the same lines in FIG. 5, as for example, the PFAIL/ signal is shown as line 124 in both FIGS. 4 and 5.

With regard to FIG. 5, the behavior of the various signals shown in FIG. 5 between the times A through E thereof is identical to those shown in FIG. 4 for these same times.

At time F in FIG. 5, the PFAIL/ signal is switched from a high to a low level, and this in turn sets the flip-flop 110 (FIG. 3), causing the Q output (NMINT signal) thereof to switch from a low to a high level as shown at point 168 (FIG. 5). A high level in the NMINT signal provides the processor 86 (FIG. 2) with a highest priority interrupt as previously explained, and as a result, the data which is in the RAMs 94 of section 84A is transferred to the non-volatile EAROMs 96 in a STORE operation, extending between times F and the adjacent time H shown in FIG. 5; the elapsed time for the STORE operation in the embodiment described is between one and twenty milliseconds.

At time H in FIG. 5, the STORE operation is completed, and the data from the volatile RAMs 94 of section 84A is stored in the non-volatile EAROMs 96 of section 84A. Thereafter, the transaction program associated with the processor 86 switches the CLRUP signal from a low to a high level as at point 170 in FIG. 5, and this sets the flip-flop 108 (FIG. 3), causing the Q/ output thereof (PWRUP/) to switch to a low level. The low level PWRUP/ signal is fed into the CLR input of the flip-flop 110 (FIG. 3) and resets it, causing the Q output thereof (NMINT) to switch from a high to a low level. Accordingly, the flip-flop 110 is disabled (i.e., the Q output thereof is not allowed to switch to a high level) as long as the CLRUP signal (to NAND gate 102 in FIG. 3) remains at a high level beginning from the time H (adjacent to time F) in FIG. 5. The significance of the flip-flop 110 being disabled is that it prevents the accidental restart of a STORE operation during a condition in which the power to the terminal 20 and system 22 is actually going down.

At time I included in the bracket 172 in FIG. 5, the DSBLMEM signal from output port 92-O of the memory section 82B (FIG. 3) is fed into the circuit 114 and resets it causing the DSBTMR output of circuit 114 (which is fed into AND gate 116) to switch from a high to a low level. The output of AND gate 116 (DSBLNVRM signal) is at a low level which disables the control circuit 118 (FIG. 3) which prevents any accidental STORE/RESTORE/ERASE operations from being performed on the memory section 84A during the condition when the power is going down. The low level state of the DSBMEM signal is also used to set the flip-flop 108, causing the Q/ output thereof (PWRUP/) to switch to a low level. At the end of time J included in bracket 172, the interrupt service routine being described waits for the PFAIL/ signal to switch from a low to a high level which indicates that the power failure has been terminated.

At time K included in the bracket 172 in FIG. 5, the PFAIL/ signal switches from a low to a high level at point 174 and this high level sets the circuit 114 (FIG. 3), causing the DSBTMR output thereof to switch from a low to a high level. A high level in the DSBTMR signal enables the control circuit 118. A high level in the PFAIL/ signal is read by the transaction program associated with the processor 86 and this switches or resets the CLRUP signal (from output port 92-O) to a low level, and this in turn resets the flip-flop 108 in FIG. 3, causing the Q/ output thereof (PWRUP/) to switch from a low to a high level at time L in bracket 172. The high level at the Q/ output of flip flop 108 allows the PWRFAIL signal (in the case of a power failure when PFAIL/ goes low) to go through gate 104 (FIG. 3), and hence, it is used to preset the flip flop 110 causing the Q output (NMINT) to switch to a high level. As soon as the CLRUP signal switches to a low level, the transaction program associated with the processor 86 begins the ERASE routine to erase the non-volatile portion EAROMs 96 of the memory section 84A.

At time M in bracket 172 in FIG. 5, the PFAIL/ signal from the terminal 20 switches again from a high to a low level which in turn sets the flip-flop 110 causing the Q output thereof (the NMINT signal) to switch from a low to a high level. A high level in the NMINT signal at point 176 in FIG. 5 interrupts the previous interrupt service and the transaction program associated with the processor 86 enters the STORE routine.

The sequential timings from the times H through L which are included in the bracket 178 in FIG. 5 are exactly the same as were described for the times H through L included in the bracket 172. The ERASE operation 180 shown in FIG. 5 erases the non-volatile EAROMs 96 of memory section 84A, whereby the operation is completed at time M (referenced also by 182) and the transaction program associated with the processor 86 then returns to the point at which the program was previously interrupted which is at time M included in bracket 172. From the point in the program represented by time M in bracket 172, the program returns to the normal mode of operation, or it returns to the originally interrupted program which is represented by the time between times E and F in FIG. 5, or times M (182) to N in FIG. 5.

The times N, O, P, and Q shown in FIG. 5 are the same as those described in the first occurrence of times F–J in FIG. 5.

The time R in FIG. 5 represents the MEDRESET/ signal 122 switching to a low level as at point 184; this indicates that the terminal is losing power or is in the process of being turned off.

Figure 6:
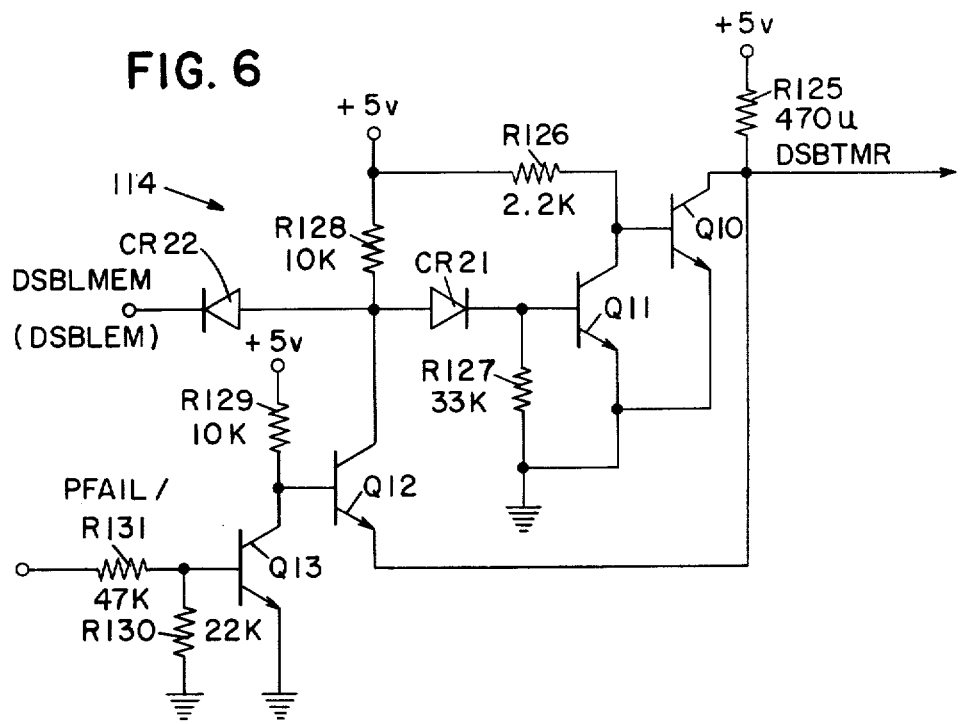
FIG. 6 is a schematic diagram showing the details of the disable circuit shown in FIG. 3.

The disable circuit 114 (FIG. 3) is shown in more detail in FIG. 6. The operation of the circuit 114 can be understood more readily in conjunction with the chart designated generally as 184 (FIG. 11) and the timing signals shown in FIG. 10.

Across the top of the chart 184 (FIG. 11) there is shown a listing of transistors which are numbered consecutively from Q1 to Q13; however, these transistors are grouped to correspond to the circuits in which they are located. For example, the transistors marked Q9, Q4, Q3, Q1, and Q2 are grouped under a bracket 118-A, and these transistors are located in the control circuit 118 shown generally in FIG. 3, and shown in detail in FIG. 7. Similarly, the transistors Q13, Q12, Q11, and Q10 which are grouped under the bracket 114-A are associated with the disable circuit 114 shown generally in FIG. 3 and shown in detail in FIG. 6. The times which are lettered consecutively from A through M in FIG. 11 correspond to these same times which are shown also in FIG. 10 which shows the relationship among various signals which are used principally in the data recovery system 22.

The chart 184 (FIG. 11) may be used as follows. At time A shown in FIG. 10 and FIG. 11, the transistors Q9, Q4, Q3, Q1 and Q2 (associated with circuit 118) all are in the non-conducting or "OFF" state shown. Only when a change occurs in the state of a transistor will there be a notation in the column for that transistor; for example, transistor Q9 is OFF at time A and remains OFF until time F when it is turned ON. Transistor Q9 is turned OFF at time G and remains OFF until time I when it is turned ON. Continuing further, transistor Q9 is switched OFF at time J and remains OFF through time M. Some additional comments with regard to the various times A–M associated with chart 184 are found in List #2 included hereinafter. The outputs of some of the transistors listed in FIG. 11 are shown directly under the associated transistor; for example, the DSBTMR signal is associated with transistor Q10 included in bracket 114-A.

Figure 7:
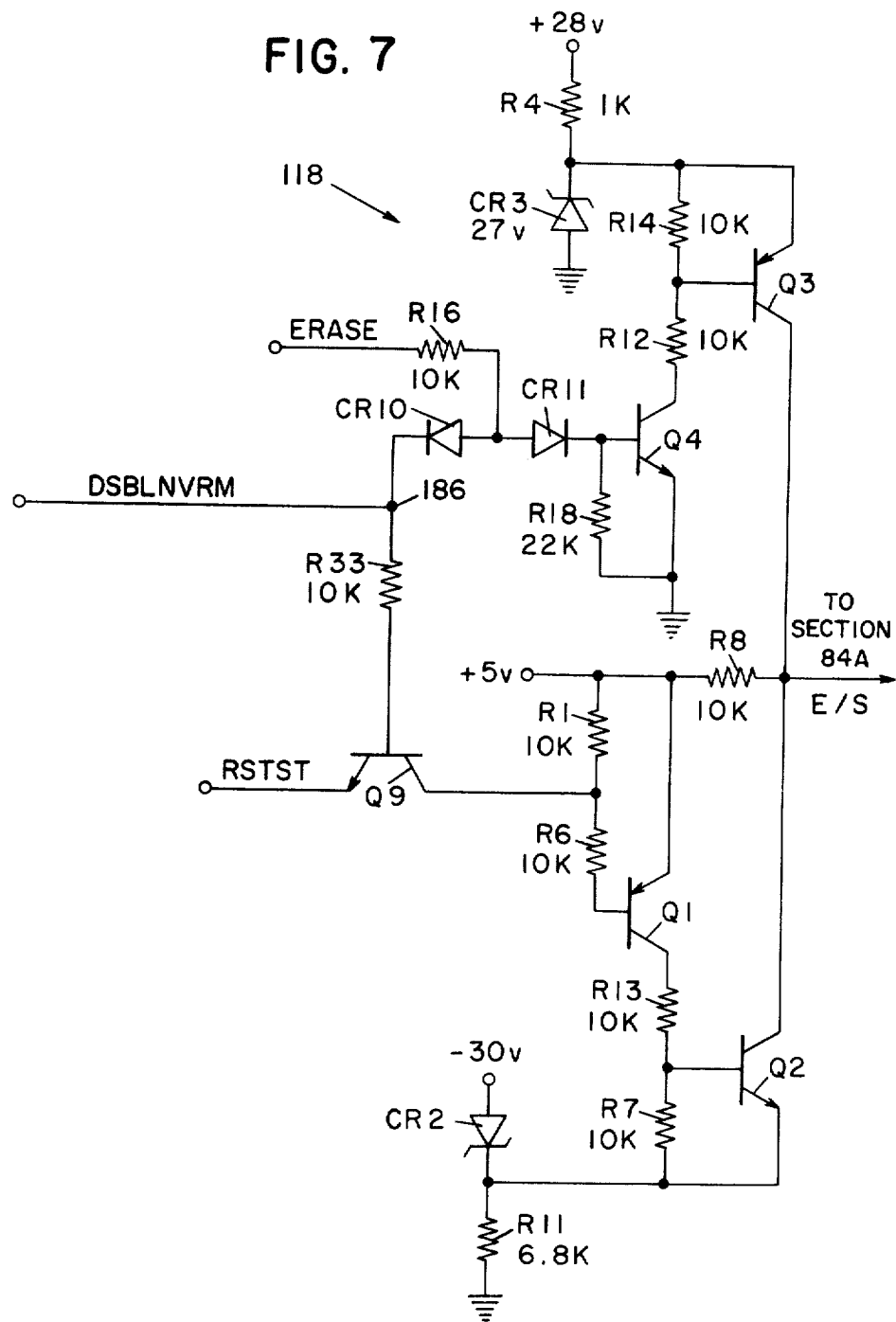
FIG. 7 is a schematic diagram showing the details of the control circuit shown in FIG. 3.

Continuing with a discussion of the disable circuit 114 (FIG. 6), the two inputs to this circuit are the PFAIL/ and DSBLMEM signals shown, and the output therefrom is the DSBTMR signal. The circuit 114 includes the transistors Q10, Q11, Q12, Q13, the resistors R125, R126, R127, R128, R129, R130, R131, and the diodes CR21 and CR22 which are interconnected as shown. The resistance values for the resistors (such as R125, R126) are shown in FIG. 6. At time A shown in FIGS. 10 and 11, the DSBLMEM signal (line 138 in FIG. 10) is at a high level and the PFAIL/ signal (line 124 in FIG. 10) is at a low level. At time A, with a low level PFAIL/ signal being fed through resistor R131 to the base of transistor Q13, this transistor Q13 will be in the OFF state as shown for time A in FIG. 11. With transistor Q13 in the OFF state, the base-emitter junction of transistor Q12 will be forward-biased, causing transistor Q12 to be ON as shown in FIG. 11. When transistor Q12 is ON at time A, transistor Q11 is OFF, and with transistor Q11 being OFF, transistor Q10 will conduct causing the collector output thereof to be tied to approximately ground level or zero volts. With the collector output of transistor Q10 being at a ground or low level, the DSBTMR signal (shown as line 142 in FIG. 10) is at a low level; in other words, the DSBTMR signal follows the collector of transistor Q10. The DSBTMR output from circuit 114 is fed into the AND gate 116 as shown in FIG. 3. When the PFAIL/ signal rises to a high level as shown at time F in FIG. 10, this high level causes the transistor Q13 to turn ON as shown in FIG. 11, and this in turn, causes transistor Q12 to turn or switch OFF. With transistor Q12 in the OFF state, and with the DSBLMEM signal (line 138 in FIG. 10) also being at a high level at time F, the transistor Q11 is turned ON; consequently, transistor Q10 is switched OFF at time F, causing the DSBTMR signal (line 142 in FIG. 10) to rise to a high level as shown at time F. When the PFAIL/ signal rises to a high level at time F (FIG. 10) it means that the operating voltages associated with the terminal 20 and the system 22 are at their appropriate levels. A high level for the DSBTMR signal which is fed into the AND gate 116 (FIG. 3) causes the DSBLNVRM output thereof to switch to a high level as shown by line 142 in FIG. 10. The DSBLNVRM output from gate 116 is fed into the control circuit 118 (FIGS. 3 and 7). From what has already been described, the operation of the circuit 114 (FIG. 6) can be readily understood by reference to the various signals shown in FIG. 10 for the times A–M and the various states of the transistors Q13, Q12, Q11, and Q10 shown in chart 184 in FIG. 11 for the times A–M.

The DSBLNVRM signal from gate 116 is fed into junction 186 included in the control circuit 118 (FIG. 7). A high level at junction 186 means that the ERASE and RESTORE (RSTST) inputs to the circuit 118 are enabled; a low level from gate 116 to this junction 186 means that the ERASE and RSTST signals or inputs to the circuit 118 are disabled; this is important in the functioning of the circuit 118. The other input to AND gate 116 (FIG. 3) is the RESETIN/ signal which is developed by the circuit 188 shown in FIG. 8. Circuit 188 is operatively connected to the power supplies (not shown but associated with the terminal 20) and is used as a back up system for protecting the memory section 84A (FIGS. 2 and 3) in the event that the PFAIL/ signal is not properly developed when these power supplies start to drop in voltage. In other words, the ERASE and RSTST inputs to circuit 118 (FIG. 7) are enabled only when there are high levels for both the RESETIN/ and PFAIL/ signals entering AND gate 116 causing the junction 186 to switch to a high level, and a low level for any of these signals will cause the output of gate 116 to switch to a low level, and a low level at junction 186 means that the ERASE and RSTST inputs to circuit 118 are disabled. The RESETIN/ signal is shown as line 190 in FIG. 10.

The control circuit 118 (FIG. 7) includes the transistors Q9, Q4, Q3, Q1, Q2, the resistors R1, R4, R6, R7, R8, R11, R12, R13, R14, R16, R18, R33, the diodes CR10, CR11, and the Zener diodes CR2 and CR3 which are all interconnected as shown in FIG. 7. Zener diode CR2 is a 10 volt diode whereas Zener diode CR3 is a 27 volt diode. The resistance values of the resistors like R1, R4, etc., in FIG. 7 are also shown on the drawing. The output of circuit 118 is the E/S signal which is fed into the memory section 84A (FIGS. 2 and 3). From what has already been described, the operation of the circuit 118 can easily be ascertained from FIGS. 7, 10 and 11.

Figure 8:
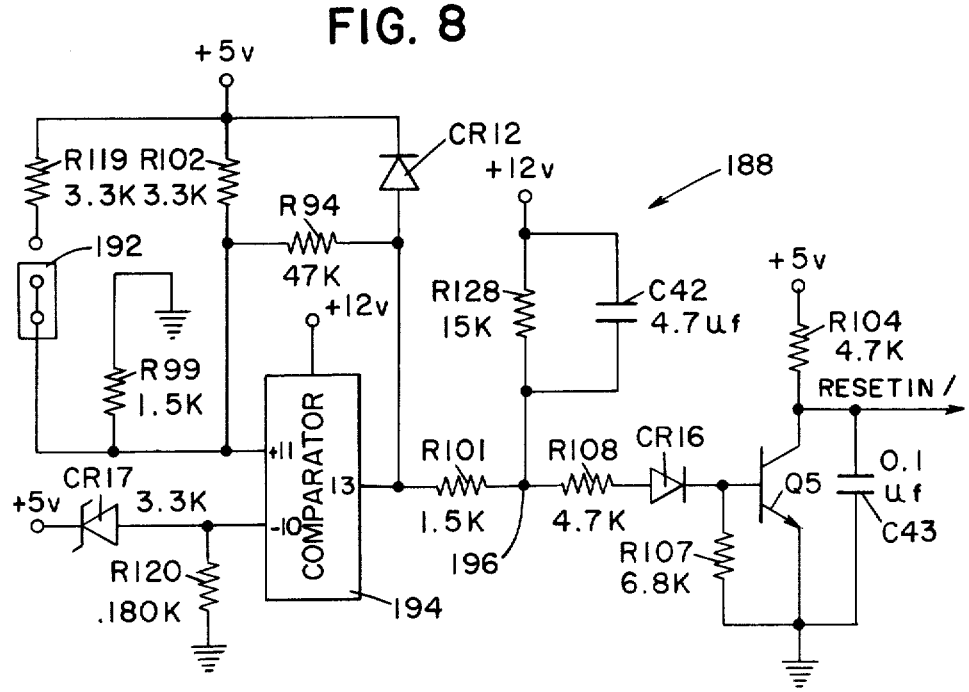
FIG. 8 is a schematic diagram showing a circuit for generating the RESETIN/ signal shown in FIG. 3.

Earlier herein, it was stated that the circuit 188 (FIG. 8) provides a back-up system for protecting the memory section 84A in the event that the power fail (PFAIL/) signal fails to develop when the power supply voltages to the recovery system 22 start to drop. The circuit 188 includes the transistor Q5, the resistors R94, R99, R101, R102, R104, R107, R108, R119, R120, R128, the diodes CR12, CR16, the Zener diode CR17 (having a threshold voltage of 3.3 volts), the capacitors C42, C43, the manually-operated shunt 192, and a conventional comparator 194 such as integrated circuit (IC) #LM339. The various values for the resistors and capacitors included in the circuit 188 are shown in FIG. 8. The comparator 194 essentially compares the voltage coming in to it with some reference voltage. Essentially, when the voltage to the input pin 11 of comparator 194 is high or greater than the voltage at input pin 10 thereof, then the output voltage at pin 13 of comparator 194 will be at a high level. In other words, the voltage at output pin 13 of comparator 194 follows the input voltage at pin 11 thereof as long as the voltage at input pin 11 is higher than the voltage at pin 10 of the comparator 194. With a high level output at pin 13 of the comparator 194, the transistor Q5 is switched ON, causing the output (RESETIN/) of the circuit to be at a low level as shown for time A in FIGS. 10 and 11. A low level signal into gate 116 (FIG. 3) keeps the entire circuit 118 disabled. When the voltage level at the input pin 10 is greater than the voltage level at pin 11 of comparator 194, the voltage level at the output pin 13 thereof will fall. As the voltages build up or are coming up in the power supply 99, the voltage level at the input pin 10 of comparator 194 will be higher than the voltage level at the input pin 11, causing the output pin 13 of the comparator 194 to switch to a low level, and this switching does not cause the output of the circuit 188 to change immediately due to the RC combination consisting of resistor R128 and capacitor C42. The voltage level at junction 196 starts to decay slowly due to the time constant of the RC combination of resistor 128 and capacitor C42. When the voltage level at junction 196 is about the same as the voltage level at pin 13 of comparator 194 (i.e. when the voltage level at junction 196 approaches zero volts) then, the transistor Q5 will be shut OFF, as shown at time B in FIG. 11, causing the collector of transistor Q5 to switch to a high level which changes the RESETIN/ output of circuit 188 to a high level as shown at point 198 (for time B) in FIG. 10. It should be recalled that a high level for the RESETIN/ signal from circuit 188 and also a high level for the DSBTMR signal from circuit 114 (FIG. 6) are required into the AND gate 116 (FIG. 3) to enable the circuit 118 as previously explained.

Figure 9:
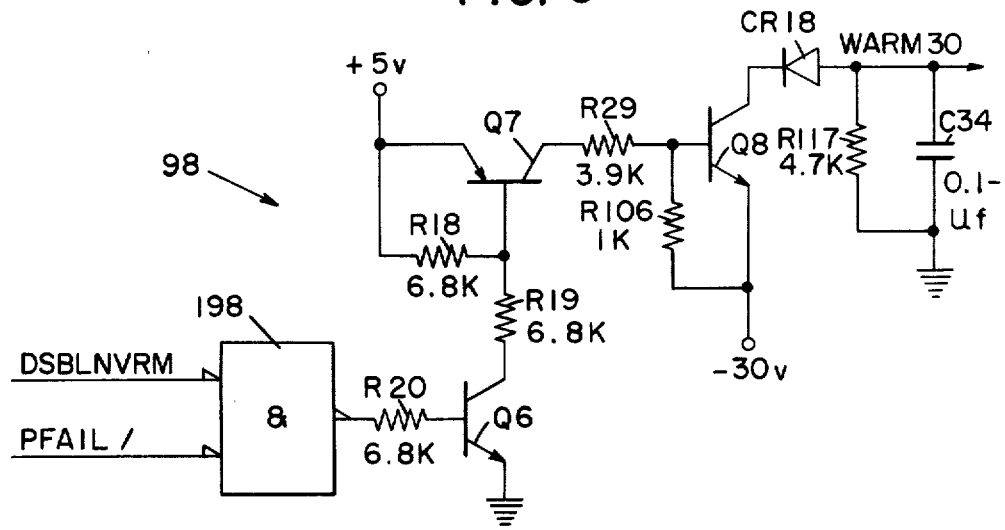
FIG. 9 is a schematic diagram of the WAROM disable control circuit shown in FIG. 2.

The WAROM disable control circuit 98 (shown in FIG. 2 and referred to as circuit 98 hereinafter) is shown in more detail in FIG. 9. The circuit 98 has the PFAIL/ signal and the DSBLNVRM signal (from AND gate 116 in FIG. 3) as inputs to an AND gate 198 included therein, and the output from the circuit 98 is the WARM30 signal which is fed into the memory section 84B (FIG. 2) to control the operation thereof. The circuit 98 also includes the transistors Q6, Q7, Q8, the resistors R18, R19, R20, R29, R106, R117, the diode CR18, and the capacitor C34 which are interconnected as shown in FIG. 9. The output WARM30 from FIG. 9 is shown on line 200 in FIG. 10. When the DSBLNVRM and PFAIL/ signals to AND gate 198 are at the high levels shown at time F in FIG. 10, the transistors Q6, Q7 and Q8 will be switched to the ON condition as shown at time F in FIG. 11, and the WARM30 will switch to a high level which enables the memory section 84B (FIG. 2). The transistors Q6, Q7, and Q8 will remain in the ON condition until time I when they are disabled, and the beginning of the STORE operation occurs.

Figure 10:
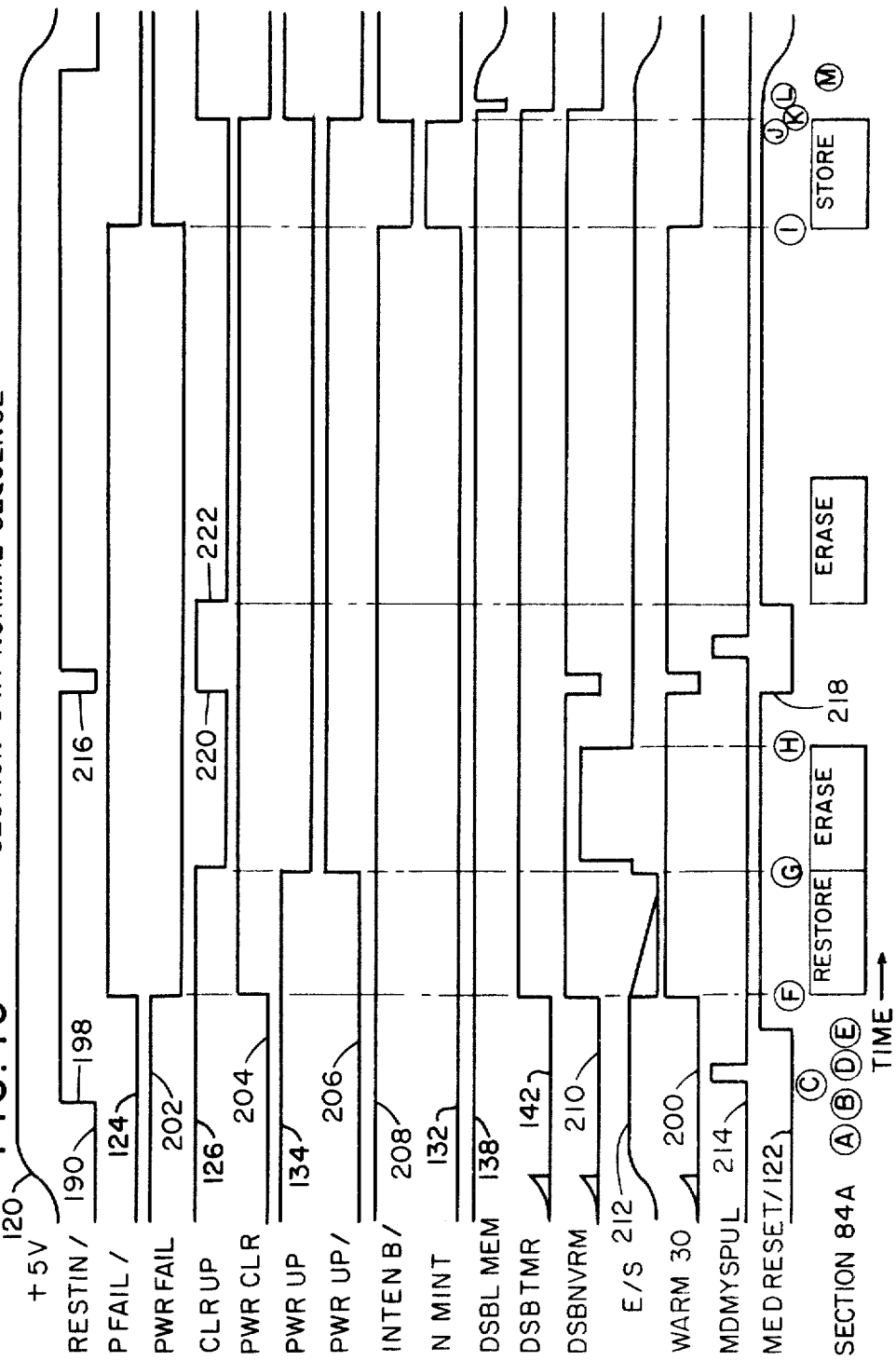
FIG. 10 is a timing diagram showing the relationship among various signals associated with one of the memory units shown in FIG. 1B.

Some additional signals associated with the system 22 are shown in FIG. 10. The PWRFAIL signal shown as line 202 is the complement of the PFAIL/ signal shown on line 124; the PWFAIL signal comes from the inverter 100 in FIG. 3. The power clear signal (PWRCLR) is shown as line 204 (FIG. 10) and comes from the output of gate 106 in FIG. 3. The PWRUP/ signal is shown as line 206 (FIG. 10) and comes from the Q/ output of flip flop 108 shown in FIG. 3. The interrupt enable signal (INTENB/) is shown as line 208 in FIG. 10 and comes from the output of NAND gate 104 shown in FIG. 3. The signal DSBNVRM is shown as line 210 in FIG. 10 and is derived from the output of AND gate 116 shown in FIG. 3. The ERASE/STORE signal E/S is shown as line 212 in FIG. 10 and is derived from the output of circuit 118 shown in FIGS. 3 and 7. The MDMYSPUL signal shown as line 214 in FIG. 10 is derived from the terminal 20 and is used for a resetting function for the memory unit 84.

With regard to FIG. 10, the switch from a high to a low level at point 216 for the RESTIN/ signal shown on line 190 represents the action caused by closing the shunt 192 (FIG. 8) which is used in field testing or servicing as earlier described herein. When the RESTIN/ signal falls to a low level at point 216, the MEDRESET signal on line 122 (FIG. 10) is changed to a low level at point 218, and this low level is fed into the ports 90 and 92 of memory sections 82A and 82B (FIG. 2) which in turn causes all the terminals of the output port 92-O to rise to a high level. This is how the CLRUP signal from terminal PA5 of output port 92-O changes from a low to a high level as at point 220 in FIG. 10. The transaction program associated with the processor 86 (FIG. 2) will read (at point 219 on line 190 in FIG. 10) the fact that the PFAIL/ signal is high (as there was no power failure but a reset is due to shunt 192) and the PWRUP signal (line 134) is at a low level at this time, and it therefore ignores the RESTORE routine (because there was no momentary power failure) and changes the CLRUP signal to a low level as shown at point 222 in FIG. 10.

The following List #2 is helpful in explaining some additional activities which occur in the system 22 during the various times A-M shown in FIGS. 10 and 11.

LIST #2

| Times Associated With FIG. 11 | Comments |
|---|---|
| A | Terminal 20 and processors 26 and 86 are in RESET. |
| B | Voltages +5 and +12 are stable. Processor 26 is out of RESET and is executing its program. Processor 86 is in RESET. |
| C | Processor 26 sends preliminary synchronization signals (line 214 in FIG. 10) to reset memory sections 84A and 84B. |
| D | Processor 26 removes preliminary synchronization signal applied in time C above. |
| E | Processor 26 removes MEDRESET signal from processor 86. |
| F | Memory Sections 84A and 84B are enabled. (Circuits 118 and 98 are enabled). Beginning of RESTORE operation. |
| G | End of RESTORE operation. Beginning of ERASE operation. |
| H | End of ERASE operation. Terminal 20 is ready to accept transactions. (Terminal is ready between Times H and I). |
| I | Memory section 84B is disabled. Begin STORE operation. |
| J | End STORE operation. |
| K | Circuit 118 is disabled by circuit 114. |
| L | DSBLMEN signal to circuit 114 switched from a low to a high level. Processors 26 and 86 are in RESET. Power to terminal 20 is turned off. |

The following are some general comments with regard to the data recovery system 22 shown in FIGS. 2 and 3. The store/erase control logic and disable control circuit 88 (FIG. 2) including the control circuits 114 and 118 shown in FIG. 3 is used to control the sequencing of the operations associated with the memory section 84A. Several safeguards are used to insure that only valid operation sequences can occur. The control circuit 118 protects the section 84A during reset and power down intervals by applying a disable signal (DSBLNVRM) to the section 84A. The memory section 84B is disabled by control circuit 98 in FIG. 2. In addition, the disable circuitry 114 can be activated under software control when required to prevent accidental loss of data.

In a normal sequence on power up, the firmware (in memory sections 82A and 82B) associated with the processor 86 initiates the RESTORE operation previously discussed in relation to FIG. 4. On completion of this operation, the (NMINT) latch (flip flop 110 in FIG. 3) is enabled to allow for power fail detection, and the ERASE operation is performed on the EAROMs 96. Normal operation is then begun. At some time later, the terminal 20 is powered down and the power down sequence is initiated. the PFAIL/ signal from the power supply 99 (FIG. 1A) triggers the NMINT signal which vectors the transaction program associated with the processor 86 to a location where the STORE operation is performed. Upon completion of the STORE operation, the NMINT latch (flip flop 110) is reset but not enabled, and the DSBLNVRM signal to circuit 118 disables it. The power in the terminal 20 can then drop to zero with no further changes to the data stored in the memory section 84A. A number of special situations or cases can occur during this normal sequence which requires the use of special logic control sequences.

The first of these logic control sequences which can occur is the occurrence of a PFAIL/ signal during a RESTORE operation. The RESTORE operation cannot be interrupted before completion thereof and insure that valid data will be available. The control circuit 88 prevents the NMINT latch (flip flop 110) from being enabled until a control signal (CLRUP) from the transaction program associated with the processor 86 enables it. Thus on power up, the RESTORE operation is always completed, and if a PFAIL/ occurred during that time, it will be detected immediately upon enabling NMINT. The STORE operation is then performed. This is a valid operation sequence.

Another of the logic control sequences which can occur is the occurrence of a PFAIL/ during ERASE. Once the RESTORE operation is performed and NMINT is enabled, the ERASE operation is begun. If a PFAIL/ occurs during this time, the STORE operation is performed. This is a valid operation sequence since no data has been changed since the RESTORE operation occurred.

Finally, another logic control sequence which can occur during normal sequencing is the occurrence of a PFAIL/ signal during a STORE operation. The first time that the PFAIL/ signal switches from a high to a low level, NMINT is set and the STORE operation is begun. The control logic 88 prevents NMINT from following PFAIL/ should it "bounce" during this time period. NMINT must be both reset and enabled by the transaction program associated with the processor 86 before another PFAIL/ signal will be recognized. Thus, the STORE operation is always completed regardless of how PFAIL/ reacts after first indicating an impending power loss.

The following will be a general discussion of the logic control sequences which are associated with a momentary power loss as discussed in association with the various signals shown in FIG. 5.

During an impending momentary power failure, the PFAIL/ signal may switch to a low or active level without the D.C. voltages from power supply 99 actually going out of tolerance. Once the A.C. input voltage to the power supply 99 has returned to its appropriate level, the PFAIL/ signal will switch to a high level, indicating that normal operation is possible. In this situation, the following sequence is used to permit automatic recovery of normal program operation. When the PFAIL/ signal switches to the low or active level, the NMINT signal (from flip flop 110 in FIG. 3) is triggered, and the STORE operation is performed. Upon completion of the STORE operation, the flip flop 110 is reset by the control signal CLRUP generated by the transaction program associated with the processor 86, but it is not enabled. The software (via the DSBLMEM signal from port 92-0 in FIG. 3) activates the circuit 114 to a low level to protect the memory sections 84A and 84B as in a normal power down sequence. Both the transaction program associated with the processor 86 and the circuit 88 (FIG. 2) then wait for the PFAIL/ signal to switch to high level indicating that the voltages of the power supply 99 are back within tolerance. When the PFAIL/ signal switches to a high level, the memory sections 84A and 84B are enabled by the control circuits 118 and 98, respectively (FIG. 3) and the NMINT signal (from flip flop 110) is enabled by the transaction program associated with processor 86 via switching the CLRUP to a low level. At this point, there is valid data in both the RAMS 94 and EAROMS 96 of section 84A since the power never actually went out of tolerance. The ERASE operation is performed to clear the EAROMS 96 of the stored data in preparation for the next power down sequence. The transaction program associated with the processor 86 can then return to normal operation by treating the NMINT signal as a normal interrupt sequence, "popping" the interrupted program status and registers (associated with the processor 86) off the stack associated with the processor 86 and returning to the interrupted point. The net effect of this interruption is that the normal program operation is interrupted for the time period it takes to perform the STORE and ERASE operations. If a PFAIL/ signal occurs again during this recovery operation, it will be recognized because the NMINT latch (flip flop 110) has been reset and enabled, and another STORE operation will occur; again, this is a valid sequence. For example, in FIG. 5 the STORE operation began at time F and the ERASE operation began at time L; however, before the ERASE operation was completed, a second PFAIL/ occurred at time M (included in bracket 172), causing the ERASE operation to be interrupted and the STORE operation to commence again. Because the power did not go down completely, there is valid data in both the RAMS 94 and the EAROMS 96, and consequently, the STORE operation can be performed over the partially erased EAROMS 96 without any errors being introduced. Again, this is a valid operation sequence.

In summary then, the following restrictions apply to the sequencing of the operations associated with the system 22.

Neither the RESTORE nor STORE operations can be interrupted before completion, otherwise invalid data can result. More than one STORE can be performed sequentially, provided no data has changed since the preceding STORE. An ERASE operation can be interrupted by a STORE operation and the data will be valid. On completion of a STORE, data is valid in both the EAROM and RAM portions of memory section 84A until the power actually goes down. Performing a RESTORE operation after an ERASE operation is invalid since null data is transferred to RAM. Performing a STORE operation after a RESTORE operation is invalid if any data changes in between the two operations.

The following Table 1 is a Data State Diagram which indicates the valid and invalid operation sequences associated with the system 22.

TABLE #1

| ↓ AFTER ← | RESTORE | ERASE | STORE |
|---|---|---|---|
| RESTORE | VALID** | VALID | VALID* |
| ERASE | INVALID | VALID | VALID |
| STORE | VALID | INVALID | VALID |

*Provided no data changes between the operations.
**Can never occur.

The following are some additional general comments associated with the general functioning of the terminal 20 and the data recovery system 22. In general the processor 26 first notifies the processor 86 of its intention to send certain key data to the system 22, and then it sends the data to the system 22. The processor 86 included in the system 22 sets a flag to indicate that it is receiving the key information. If a PFAIL/ signal occurs during this time, the processor finishes receiving the data and loads it into the RAMS 94. Therafter, the data from the RAMS 94 is transferred to the EAROMS 96 via the STORE operation of the interrupt routine mentioned. Multiple PFAIL/ signals as shown in FIG. 5 are handled by a multiple nested interrupt service routine in that data for example, from a first interrupt is pushed on to a relative stack address 0, data from a second interrupt is pushed on to a relative stack address 1, and data from a third interrupt is pushed on to a relative stack address 2. When the momentary PFAIL/ signal returns to the high level, as previously stated, the transaction program associated with processor 86 will "pop" the data off relative stack address 2 in the illustration given and then pop the data off relative stack address 1, and finally pop the data off relative stack address 0, assuming that no additional PFAIL/ signals occur. At this time, the terminal 20 returns to that point at which it was prior to the first PFAIL/ signal occurring.

A feature of the system 22 is that the system 22 interrupts itself with the same interrupt (PFAIL/ signal). The number of successive PFAIL/ interrupts which the system 22 can handle is dependent essentially upon the capacity of the RAMS 94 and the EAROMS 96. Another feature is that system 22 is activated by firmware and it can only be deactivated by hardware, the firmware has the ability of determining when the memory section 84A should be disabled or cut off from the bus 89 and the hardware described has the capability of indicating (via a high level PFAIL/ signal) when normal operations are to be resumed by the system 22.

We claim:

1. A system for preserving data comprising:
 a memory unit comprising first and second sections for storing data, said first section being volatile and said second section being non-volatile;
 means for processing data being operatively coupled to said memory unit for processing said data; said processing means including a processor and a multiple nested interrupt service routine; and
 means for controlling the transfer of said data between said first and second sections; said controlling means being responsive to the occurrence of a restore signal from said processing means during initialization to transfer said data from said second section to said first section; said controlling means also being responsive to an erase signal from said processing means during initialization to clear said data from said second section; said controlling means also being responsive to a power fail signal to transfer said data from said first section to said cleared second section;
 said power fail signal indicating at least an impending power failure to said memory unit;
 a first circuit means included in said controlling means for generating an interrupt signal in response to a said power fail signal;
 said controlling means being responsive to a first said power fail signal to transfer said data from said first section to said cleared second section;
 said first circuit means generating said interrupt signal in response to said first power fail signal to interrupt said processor at a first point in the processing of said data and also to initiate said multiple nested interrupt service routine;

said multiple nested interrupt service routine and said processing means being effective to condition said first circuit means by resetting it to respond to second and subsequent said power fail signals to produce second and subsequent said interrupt signals to interrupt said processor at second and subsequent points in said multiple nested interrupt service routine in said processing of data to preserve said data;

said processing means including means for storing the location at which said first point in the interruption of the processing of said data occurred and for storing the locations of said second and subsequent points; and said multiple nested interrupt service routine and said processing means utilizing the locations in said storing means to return said processing of data to said first point in the absence of further subsequent said power fail signals.

2. The system as claimed in claim 1 in which said controlling means further comprises means for disabling said memory unit after said data is transferred to said second section, and in which said disabling means includes a first circuit which generates a control signal which when in a first binary state is utilized to enable said memory unit in response to the binary complement of a said power fail signal and which said control signal when in the second binary state is also utilized to disable said memory unit.

3. The system as claimed in claim 2 in which said memory unit has erase, store, and disable inputs thereto, and also in which said disabling means includes a second circuit which receives said control signal and generates a second control signal which is fed into said disable input to said memory unit so as to disable said erase and store inputs.

* * * * *